Oct. 18, 1949.  A. H. HOFBERG  2,485,444
METHOD OF PRODUCING ROUNDED
TERMINALS OF FUSIBLE METAL
Filed Oct. 27, 1943
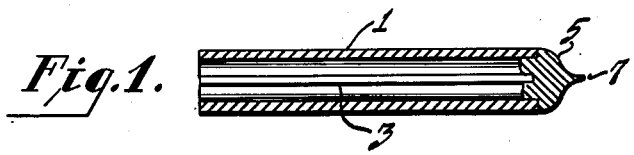
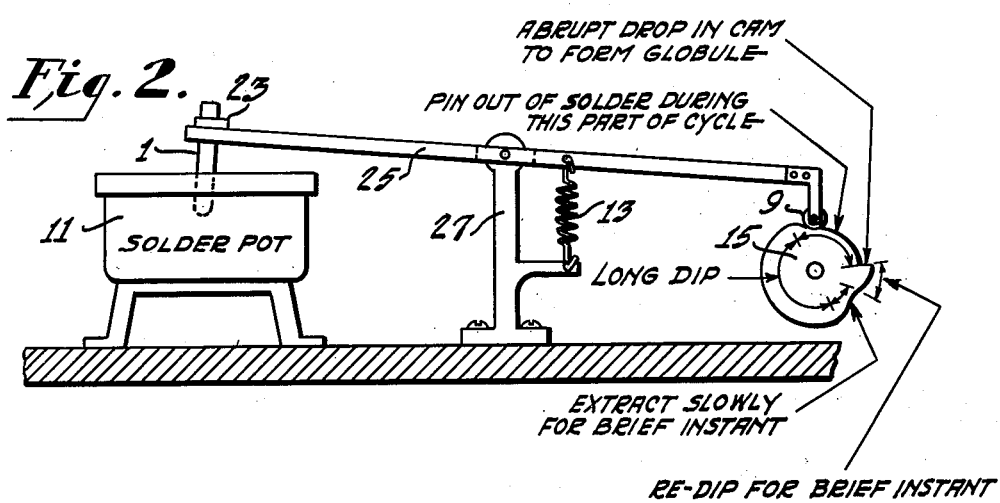
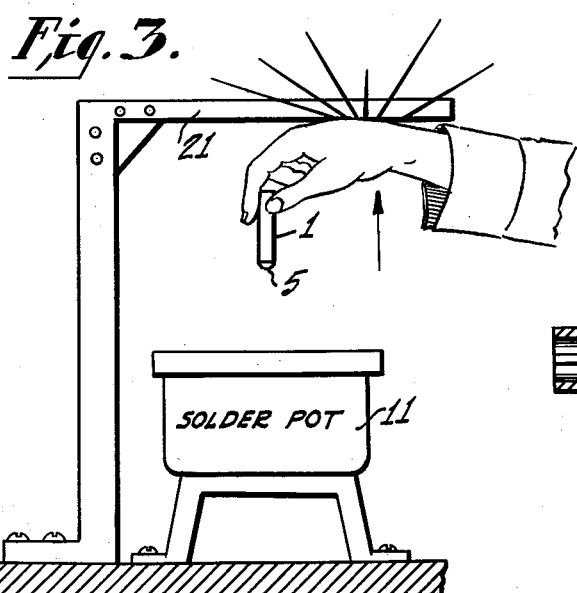
Inventor
ALF H. HOFBERG
By
Attorney Patented Oct. 18, 1949

2,485,444

UNITED STATES PATENT OFFICE 2,485,444

METHOD OF PRODUCING ROUNDED TERMINALS OF FUSIBLE METAL

Alf H. Hofberg, Medford, N. J., assignor to Radio Corporation of America, a corporation of Delaware Application October 27, 1943, Serial No. 507,905

5 Claims. (Cl. 29—155.55)

1

This invention relates to the art of making rounded terminals and joints on metal parts such, for example, as the hollow metal prongs commonly employed as connectors for electrical devices of the plug-in type.

The invention will be described in connection with the accompanying drawing, wherein:

Figure 1 is a longitudinal sectional view of a hollow plug-in type connector during an intermediate stage of its assembly and which will be referred to in explaining the problem and principle of the invention, Figure 2 is an elevational view of one form of apparatus which may be employed in practicing the method of the present invention, Figure 3 is a pictorial view showing the method of the invention as it may be practiced manually, and, Figure 4 is a longitudinal sectional view of a hollow plug-type connector which has been provided, in accordance with the method of the present invention, with a rounded, solder terminal.

Referring to Fig. 1: If solder is applied to the end of a metal part such, for example, as the tubular metal prong 1 and inner conductor 3, by immersing the said parts in molten solder and subsequently withdrawing them from the solder bath, in the manner dictated by the prior art, the surface of the combined joint and closure 5 on the said end will have a pointed protuberance thereon which is similar, ordinarily, to the one shown at 7. This is so because the serving of molten solder on the end of the prong is so heavy that the force of gravity is sufficient to at least partially overcome the molecular forces (present in the surface film of all liquids) which tend to bring the contained volume of molten solder into a form having the least superficial area.

Two methods have heretofore been proposed for removing such points from solder terminals. In accordance with one method, a small cup-shape mold is applied over the terminal and sufficient force applied to round out, or otherwise reform, the point. Alternatively, such points have been ground down with a suitably shaped burr. The present invention dispenses with the necessity for such auxiliary molding and grinding operations and provides a rounded terminal free from scratches, mold marks and other surface imperfections which may affect the electrical continuity between the circuit elements which the said terminal is designed to connect.

The foregoing and other objects and advantages are achieved, in accordance with the invention, by immersing the prong-end, or other metal

2 part, upon which the rounded terminal is to be formed, in a pool of molten solder, withdrawing the part from the pool and subjecting it, and hence the drop of molten solder which depends therefrom, to rapid vertical movement, and then abruptly arresting or halting the said movement. The sudden cessation of the vertical movement apparently introduces a property or an effect (inertia) within the still molten solder which augments the molecular forces (surface tension) normally at work within its surface film, and these combined forces apparently are of sufficient intensity to overcome the force (gravity) originally responsible for the creation of the point. In any event, when the foregoing procedure is followed, that portion of the solder of which the point is comprised appears to be drawn up or projected into the main body of the globule, which then assumes the rounded, smooth-surfaced form shown at 5' in Fig. 4.

The method of the present invention lends itself readily to the mass production of rounded, solder terminals. One simple form of apparatus which may be used in carrying the method of the invention into effect is shown in Fig. 2, wherein the hollow pins 1 or other metal parts to be treated are affixed as by means of spring clips 23 to one end of a lever 25 which is pivoted adjacent to its center on a support 27 and which is provided at its opposite end with a cam-follower 9. A pot 11, mounted beneath that end of the lever upon which the articles are mounted, contains the molten solder with which the articles are to be treated. The cam follower 9 is biased, as by means of a spring 13 on the support 27, to bear against a cam 15 which will be understood to be driven continuously in the clockwise direction. The rise of the cam 15 is so designed that, at the beginning of the cycle, the free end of the lever is maintained in its raised position for a period sufficiently long to permit of its being loaded with the articles to be treated. As the cam 15 rotates in contact with the follower 9, the lever 25 is moved against the force of its bias to a position whereat the ends of the articles 1 are immersed in the molten solder for a period sufficiently long to acquire a portion or serving of solder.

Thereafter, a short depressed segment on the cam surface serves to lift the articles out of the solder for a brief instant, to initiate cooling, whereupon the following short raised segment causes the articles to be re-dipped in the solder for a short period. The brief removal and subsequent re-dipping of the articles has been found to eliminate any tendency of the applied solder to wrinkle, apparently by preventing it from cooling too rapidly. The final segment of the cam surface comprises an abrupt drop or dwell which causes the articles to be ejected rapidly from the solder pool. As previously mentioned, it is this rapid vertical movement and the abrupt halting of the said movement that prevents the solder on the ends of the articles from acquiring an undesired point (7, Fig. 1) and causes it to be formed into a round smooth-surfaced terminal similar to that shown at 5' in Fig. 4.

It will be apparent that the apparatus of Fig. 2 may be arranged to handle any desired number of articles simultaneously. When the articles to be treated comprise plug-in connectors, the plugs will ordinarily be attached to the casings, or envelopes of the units which they are designed to serve, prior to being treated. In this case, the apertures in the lever 25 in which the prongs 1 are seated should, of course, be arranged in a pattern calculated to accommodate the prongs of a particular unit or group of units.

While the apparatus of the invention may assume other and more complicated forms than the one shown in Fig. 2, the method of the invention can also be practiced manually. Thus, referring to Fig. 3, the part to be treated may be dipped in and removed from the solder by hand and the rapid vertical movement dictated by the invention halted as by a preferably padded stop 21 mounted above the solder pot. The solder may comprise any standard mixture having a low (as compared to silver) surface tension, e. g., 60 per cent lead, 40 per cent tin, and should ordinarily be maintained at a temperature within the pot of about 240° C. The parts to be soldered should be cleaned and flux applied in the usual manner prior to soldering.

Various other modifications and applications of the invention will suggest themselves to those skilled in the art. Accordingly, the foregoing specification is to be interpreted as illustrative and not in a limiting sense except as required by the prior art and by the spirit of the appended claims.

What is claimed is:

1. A method of forming a dependent terminal on a metal part wherein said terminal is formed from molten metal having a surface tension insufficient to cause said molten metal to assume a form having the least superficial area when suspended in the molten state, said method comprising the steps of depositing a serving of said molten metal on the lower end of said part, subjecting said part and said serving of molten metal to vertical movement, abruptly halting said vertical movement whereby the surface tension within said serving of molten metal is augmented by the forces induced therein by inertia and causes said serving of molten metal to assume a form having the least superficial area, and then permitting said serving of molten metal to solidify.

2. A method of forming a rounded terminal on a metal part wherein said terminal is formed from molten metal having a surface tension insufficient to cause said molten metal to assume a form having the least superficial area when suspended in the molten state, said method comprising the steps of depositing a serving of said molten metal on the lower end of said part, subjecting said part and said serving of molten metal to vertical movement, and then abruptly halting said movement.

3. A method of forming a rounded terminal on a metal part, said method comprising the steps of immersing said part in a pool of molten metal having a surface tension insufficient to cause said molten metal to assume a form having the least superficial area when suspended in the molten state to cause a serving of said molten metal to adhere to said part, withdrawing said part and its serving of said molten metal from said pool with a vertical movement, suddenly halting said movement, and then permitting said serving of molten metal to solidify.

4. A method of forming a rounded terminal on a metal part which comprises the steps of dipping an end of said part in a pool of molten metal having a surface tension insufficient to cause said molten metal to assume a form having the least superficial area when suspended in the molten state to cause a serving of said molten metal to adhere thereto, withdrawing said end and its serving of said molten metal from said pool, re-dipping said end in said pool before said serving of molten metal has cooled, thereafter withdrawing said end from said pool with a rapid vertical movement, abruptly arresting said movement and then permitting the serving of molten metal on said end to cool.

5. A method of forming a rounded terminal on a metal part, said method comprising depositing a serving of molten solder comprising substantially 60% lead and 40% tin, on the lower end of said part, subjecting said part and said serving of molten solder to vertical movement, and then abruptly halting said movement.

ALF H. HOFBERG.

REFERENCES CITED

The following references are of record in the file of this patent:

UNITED STATES PATENTS

| Number | Name | Date |
|---|---|---|
| 1,789,709 | Poole | Jan. 20, 1931 |
| 2,319,610 | Lake | May 18, 1943 |

OTHER REFERENCES

Metals Handbook, 1939 ed., pp. 98 and 1546; pub. by Amer'n Soc. for Metals, Cleveland, Ohio.